WILLIAM KELLY.
Improvement in making Steel Castings.
No. 5,636. Reissued Oct. 28, 1873.
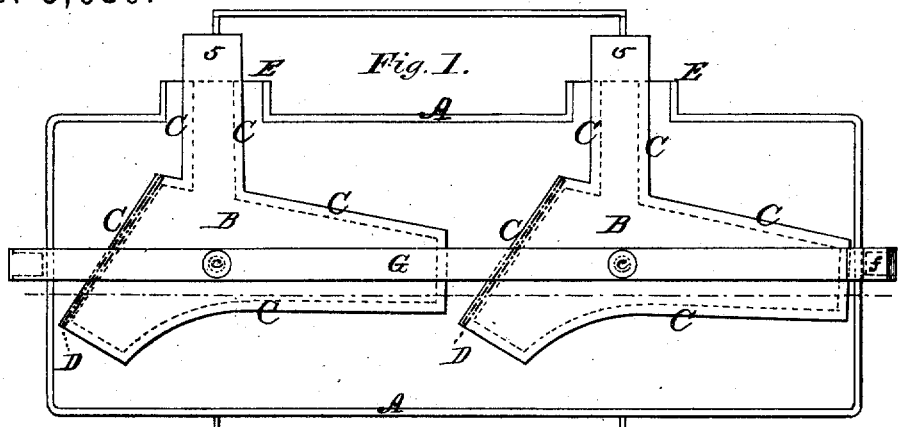
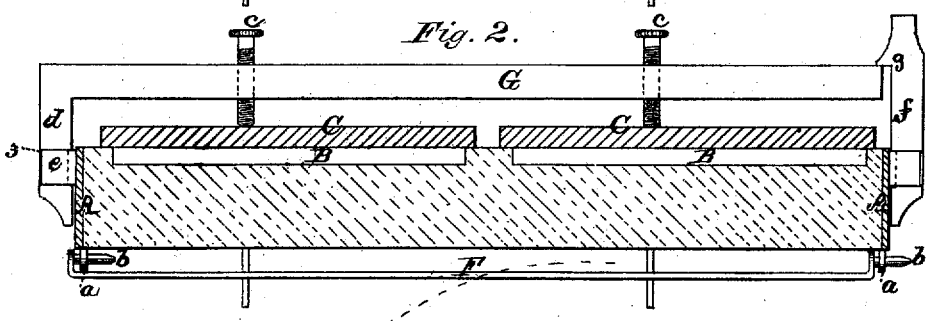
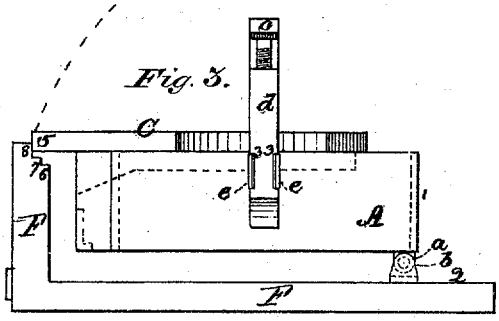
Witnesses:
T. C. Brecht,
M. H. Doolittle,
Inventor:
Wm Kelly
By Atty. Wm. Ewl. Sutine
AM. PHOTO-LITHOGRAPHIC CO. N.Y. (OSBORNE'S PROCESS)

UNITED STATES PATENT OFFICE

WILLIAM KELLY, OF LOUISVILLE, KENTUCKY, ASSIGNOR OF ONE-HALF INTEREST TO THOMAS C. COLEMAN.

IMPROVEMENT IN THE MANUFACTURE OF STEEL CASTINGS.

Specification forming part of Letters Patent No. 122,255, dated December 26, 1871; reissue No. 5,636, dated October 28, 1873; application filed January 21, 1873.

*To all whom it may concern:*

Be it known that I, WILLIAM KELLY, of Louisville, in the county of Jefferson and State of Kentucky, have invented certain new and useful Improvements in the Process of Making Steel Castings; and I do hereby declare that the following is a full and exact description thereof, reference being had to the accompanying drawing making a part of this application.

My invention consists in the process and apparatus for molding steel, by which the difficulties heretofore experienced of making sound castings are overcome, as will be hereinafter more fully set forth.

In pouring fluid steel into a mold the intense heat contained in the same produces vaporization of small particles, and the inability of this vapor to escape produces small holes, or "honey-combs," as they are sometimes called, which, of course, render the casting more or less weak, and otherwise objectionable. Many attempts have been made to overcome this difficulty, but with ill success. The most important has been the employment of copper molds, the great conducting power of the copper serving to convey the heat away so rapidly as to prevent the vaporization and consequent formation of honey-comb; but this cure brings with it an objection in another direction, namely, that where the casting is at all intricate, or has any inequalities of form varying materially from a smooth surface, the copper mold, being rigid and inflexible, the rapid cooling and contraction of the steel will cause it to crack, so that, for very many forms of castings, copper molds cannot be constructed so as to relieve the castings quick enough to prevent cracking; and, again, where the casting is designed to have thin edges these thin edges are liable to be defective from "wants" or spaces in the mold not filled up with steel. Another objection is the difficulty of freeing the castings from the mold. To remedy these objections is the object of my invention; and to enable those skilled in the art to more fully understand the same, I will proceed to describe the process and apparatus used by me, referring by letters to the accompanying drawing, in which—

Figure 1 is a top view of a mold ready to receive the fluid steel to form two plow-points. Fig. 2 is a vertical cross-section at the line *x x*, Fig. 1. Fig. 3 is an end view looking from the left at Fig. 1.

Similar letters indicate like parts in the several figures.

A is an iron frame or flask, intended to contain dry or green molding-sand, or any other material that will readily compress during the shrinking of the steel when cooling, so as not to crack the casting, and also give a free vent to the gases which are generated by contact between the hot steel and the said material. B B indicate the molds for two plow-points made therein. The lines C C are the outlines of the two "copes" or covers of copper, of a shape corresponding with and adapted to fit over and close the molds; and the heavy dotted lines D D represent pieces of copper embedded in the sand, or other suitable material, so as to act as a facing to that part of the plow-point called the "land-side." The pouring-gates are at the top of the flask, and are represented by letters E E. The flask is provided with two journals or lugs, *a a*, adapted to receive two pintles, *b b*, arranged on the bed-plate or frame F, which is laid on the floor of the casting-house. In pouring the fluid steel the flask is turned up at right angles to the position shown at Fig. 3, as indicated by the dotted arc, the point 1 of the flask resting on the point 2 of the floor-frame, and as soon as filled it is turned back to the position shown at Fig. 3 to cool. G is a clamping-bar for holding the "copes" or covers C C in place, by means of two thumb or set screws, *c c*. The construction of this clamp-bar is clearly shown at Fig. 2. The end to the left is turned down at right angles, as seen at *d*, and is slightly cut away, or shoulders formed thereon, at 3 to lock it with an open staple, *e*, one of which is secured or cast upon either end of the flask. Another end piece, *f*, independent of the bar G, and similar to the one *d*, (except it is longer and is provided with a shoulder, *g*, arranged to overlap the end of G,) is secured in a like manner to the other end of this flask, and thus the bar G is held in place by the screws *c c* being forced down against the copes or covers C C, which they also hold in place. The end piece *f* I denominate the trigger, and its operation I will presently describe. The copes C C, it will be seen by reference to Figs. 1 and 3, extend over the edge of the flask at 5 and rest upon one of a series of steps, 6 7 8, in the upright F. This, it will be observed, holds the flask in the position seen at Fig. 3, so that when the trigger *f* is knocked off the flask will drop down on the frame F, while the end of the copes remaining on the steps is slightly lifted up, allowing the thick side of the casting to be first exposed to the action of the air. The flask is allowed to remain thus for about ten minutes, so as to cool off, when it can be opened and the castings removed.

I have found from experience that thin castings are less likely to crack when the flask is turned up in a vertical position, with the thinnest edge uppermost, and the gate placed thereat for pouring, and then returned to a horizontal position for a definite space of time before opening the copes. The reason appears to be that the lines of contraction change with the changed position of the flask. In other words, I have found it advisable and important to gate the casting on its thinnest edge, and then alter the position of the flask prior to final cooling.

Having described the apparatus, I will now describe the process for molding steel castings. The mold in the sand, or other suitable material, having been designed, I place at such points as experience will suggest pieces of copper to serve as conductors of heat, while the interposed sand, or its equivalent—that is, that which is between the copper and the casting—allows the contraction of the latter without cracking, thus embodying the important features of both a copper and a sand or other mold without the ill effects experienced in each by itself.

I am aware that pieces of iron have been placed in sand-molds where iron castings are to be made for the purpose of chilling the casting; but the object of the copper in my process is for an entirely different result, and does not chill the casting in the slightest degree, as experience has fully demonstrated.

When the casting is of such configuration as to have a thin and a thick edge, ordinarily the thin edge is most likely to crack, not having as much strength to resist and overcome the binding influence arising from the metallic cope while contraction is taking place. This difficulty is entirely overcome by slightly displacing the copper cope just sufficient to remove it from its original bed by a sliding movement, thereby loosing it from the casting without opening the flask; and it may be entirely opened, as hereinbefore set forth.

Having described the apparatus and process, what I claim as new, and desire to secure by Letters Patent is—

1. The process herein described of preventing cracking, porosity, or other defects in steel castings by the employment of copper, or its equivalent, in a mold of sand, or other suitable material, substantially as herein set forth.

2. The process of pouring fluid steel into a mold while in a vertical position, with its thinnest edge uppermost, having the pouring-gate fixed thereon, and turning the same soon after pouring into a horizontal position to allow it to cool, substantially as and for the purpose set forth.

3. The flask mounted on journals, substantially as described, so that when turned over, the clamps being released, the drag, with the castings, will be thrown forward and thus free the casting from binding.

4. In the apparatus, the combination and arrangement of the flask with the floor-frame, the copes, the clamp-bar, set-screw, and trigger, all constructed substantially as described, for the purposes set forth.

WM. KELLY. [L. S.]

Witnesses:
JOS. CARROLL,
R. B. COTTER.